(12) United States Patent
Taft

(10) Patent No.: X6648
(45) Date of Patent: Jul. 20, 1831

(54) PASTEBOARD, &C., MANUFACTURING

(76) Inventor: Frederick A. Taft

Frederick A. Taft, of Dedham, State of Massachusetts

Letters Patent.

The schedule referred to in these Letters Patent and making part of the
same, containing a description in the words of the said Frederick A.
Taft, himself of his improvement in manufacturing Paste Board & other
paper. To all to whom these presents shall come.

Be it known that I Frederick A. Taft of Dedham in the County
of Norfolk, Commonwealth of Massachusetts, manufacturer, have invented
a new and useful improvement in the art of making Paste Board and other
paper, and that the following is an exact description of my new and useful
improvement in the art aforesaid, —
It consists in the mixing of solid pitch or rosin with fibrous substances
for the making of Paste Board and other paper, and the cementing the
whole together after the paper is made into sheets by the application of heat
so as to soften the pitch or rosin and when in this softened state, the
whole is consolidated by running the paper under or between rollers,
My usual process is as follows, (although it may be varied in different ways
to come to the same result) I pulverize the pitch or rosin and mix
it with the fibrous stock in the engine or other parts of the machinery, and
when the paper is made and sufficiently dry I roll it between hot rollers, which
cements and consolidates the whole together. —
What I claim is the right of making and vending paper made by mix-
ing solid Pitch or Rosin with fibrous substances and the cementing the
whole together after the paper is made into sheets by softening the solid pitch
or rosin by means of heat and rolling it when in this softened state Witnesses
[illegible] Warren
[illegible] [illegible]

Frederick A. Taft